United States Patent
Irmisch et al.

(10) Patent No.: US 7,207,108 B2
(45) Date of Patent: Apr. 24, 2007

(54) PROCESS FOR PRODUCING A TURBINE BLADE OR VANE

(75) Inventors: Stefan Irmisch, Untersiggenthal (CH); Erhard Kreis, Otelfingen (CH); Christoph Nagler, Zurich (CH); Andre Schwind, Crottendorf (DE)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 10/713,098

(22) Filed: Nov. 17, 2003

(65) Prior Publication Data
US 2004/0111885 A1 Jun. 17, 2004

(30) Foreign Application Priority Data
Nov. 28, 2002 (DE) ............... 102 55 346

(51) Int. Cl.
*B21B 1/46* (2006.01)
*B21K 25/00* (2006.01)

(52) U.S. Cl. .............. 29/889.7; 29/889.2; 29/527.6

(58) Field of Classification Search .......... 29/889, 29/889.1, 889.2, 889.6, 889.61, 889.7, 889.71, 29/889.72, 889.721, 889.722, 527.1–527.7; 164/35, 76.1, 516
See application file for complete search history.

(56) References Cited

U.S. PATENT DOCUMENTS

| | | | | |
|---|---|---|---|---|
| 4,031,809 A * | 6/1977 | Shraiman et al. | ............. | 409/84 |
| 4,434,835 A * | 3/1984 | Willgoose | .............. | 164/34 |
| 5,193,314 A * | 3/1993 | Wormley et al. | ........... | 451/5 |
| 5,299,353 A | 4/1994 | Nazmy et al. | | |
| 5,465,780 A * | 11/1995 | Muntner et al. | .......... | 164/516 |
| 5,733,080 A * | 3/1998 | David et al. | ............. | 409/132 |
| 6,435,256 B1 * | 8/2002 | Anderson et al. | ........... | 164/35 |
| 6,705,383 B2 * | 3/2004 | Beeck et al. | ............. | 164/76.1 |

FOREIGN PATENT DOCUMENTS

| | | |
|---|---|---|
| DE | 696 08 389 T2 | 10/1995 |
| EP | 1 216 770 A2 | 6/2002 |
| GB | 627 295 | 8/1949 |
| GB | 660 282 | 11/1951 |
| GB | 916 672 | 1/1963 |
| GB | 1 158 813 | 7/1969 |
| GB | 2 324 835 A | 11/1998 |

* cited by examiner

*Primary Examiner*—Marc Jimenez
(74) *Attorney, Agent, or Firm*—Oblon, Spivak, McClelland, Maier & Neustadt, P.C.

(57) ABSTRACT

In a process for producing a turbine blade or vane, providing a casting mold for casting the turbine blade or vane, the casting mold including a blade or vane platform and a main blade or vane part, and a position of the main blade or vane part relative to the blade or vane platform determining a first angle of incidence; providing additional machining stock to the blade or vane platform at predetermined locations; machining the casting using a process which is specified for the first angle of incidence; rotating the casting around a longitudinal axis for an angle which is equal to the difference between said first angle of incidence and a second angle of incidence, and subjecting said rotated casting to said machining process to remove at least partially the additional machining stock.

6 Claims, 1 Drawing Sheet

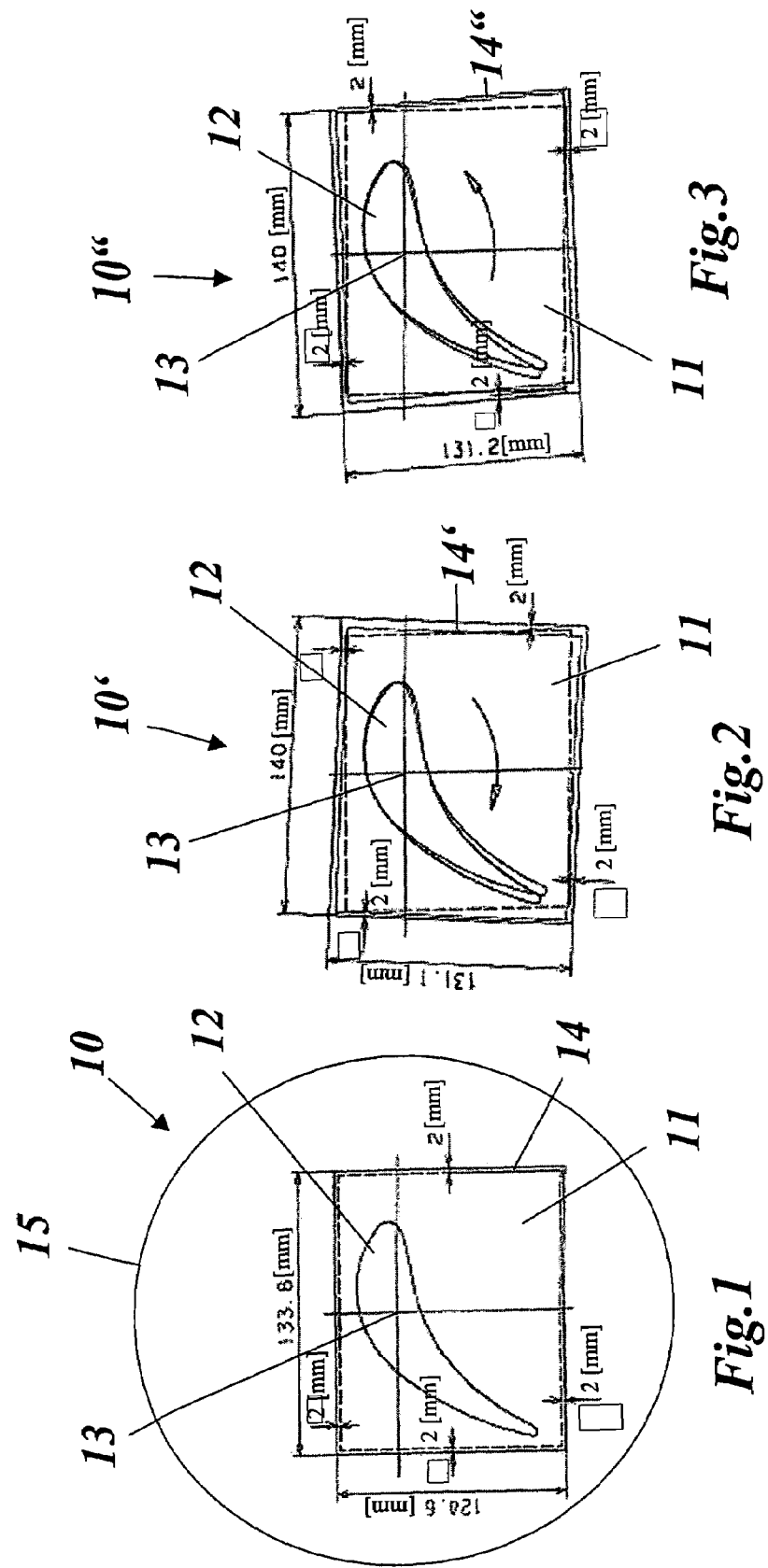

PROCESS FOR PRODUCING A TURBINE BLADE OR VANE

BACKGROUND OF THE INVENTION

FIELD OF THE INVENTION

The present invention deals with the field of turbines. It relates to a process for producing a turbine blade or vane.

DISCUSSION OF BACKGROUND

When developing a turbine stage, it may sometimes be difficult to bring the precalculated output into line with the effectiveness objectives. These difficulties arise during the casting and during the machining process of the turbine blades or vanes, since numerous deviations accumulate there and lead to a certain discrepancy. In the finished machine, there is in reality a difference between the benchmark calculations and the turbine both with regard to development and with regard to production. Depending on the magnitude of the difference, subsequent corrections may be required. It is therefore desirable to reduce this difference in order to actually achieve the precalculated fluid-dynamic target values of the turbine.

One basic way of solving this problem is based on the possibility of adjusting the flow path of the gases in the turbine stage by rotating the profile of the turbine blade or vane (about the longitudinal axis) into the desired position.

One way of doing this is to use an adjustable casting mold. For example, EP-A2-1 216 770 discloses a tool and a process for casting a shaped part from wax for the production of a turbine blade or vane, in which several tool blocks are assembled with positive engagement in a predetermined manner and form a cavity for the shaped part which is to be cast. At least one of the tool blocks receives a rotatable or displaceable insert or inset which borders on the cavity with a surface and which can be fixed in different positions or orientations with respect to the tool block.

The known casting tool allows a subsequent change to the geometry of the shaped part and in particular its setting angle or the leading-edge geometry, without new tool blocks having to be produced for this purpose. However, a drawback of this tool is that all changes during casting entail a considerable amount of work and time.

SUMMARY OF THE INVENTION

Accordingly, one object of the invention is to provide a process for producing a turbine blade or vane which avoids the drawbacks of known processes which have been pointed out and allows the leading-edge geometry of the blade or vane to be altered in order to optimize the turbine properties in a particularly simple and rapid way.

The essence of the invention involves achieving a leading-edge angle of the turbine blade or vane which has been altered in order to optimize the turbine by changing the machining of the casting while retaining the same casting mold. This solution takes account of the discovery that, after development of the blade or vane has been concluded, changes should generally either be avoided altogether or carried out as early as possible, but at the same time the later changes of this type take place in the production sequence, the more successful they are. Any changes during the machining step only affect the machining tools. This significantly reduces the time delay compared to a change performed during casting. The leading-edge angle of the turbine blade or vane is altered by the casting being rotated through a correction angle about the blade or vane longitudinal axis in order to be machined.

A first preferred configuration of the invention is characterized in that the casting is held in a holder during the machining, and in that the casting is rotated in the holder for the purpose of changing the machining, with the reference points required for the machining being repositioned.

Alternatively, it is possible for the casting to be rotated together with the holder for the purpose of changing the machining, with the correctly calculated distances being used to reach the desired position.

A particularly preferred configuration of the invention is distinguished by the fact that an additional machining stock is provided on the casting for the material-removing machining, and that the thickness of the additional machining stock is selected to be sufficiently above a minimum value for it to be possible for a turbine blade or vane which has a leading-edge angle which can be selected freely within a predetermined range of angles to be produced by machining from the same casting.

In this context, it is particularly expedient if the casting or the turbine blade or vane has a blade or vane platform and a main blade or vane part, and if the additional machining stock above the minimum value is provided on the blade or vane platform.

It is preferable for the minimum value for the additional machining stock to be approximately 2 mm, and for the additional machining stock above the minimum value to amount to a total of about 5 mm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a plan view from above of a casting for a turbine blade or vane having a blade or vane platform and a main blade or vane part in accordance with the prior art, with an additional machining stock of 2 mm provided on the blade or vane platform;

FIG. 2 shows, in an illustration similar to that shown in FIG. 1, a first exemplary embodiment of the invention, in which the casting has, on the blade or vane platform, an additional machining stock over and above the minimum value of 2 mm, so that it is even possible to produce a turbine blade or vane which has been rotated through 3° in the clockwise direction from the same casting; and FIG. 3 shows, in an illustration similar to that shown in FIG. 1, a second exemplary embodiment of the invention, in which the casting has, on the blade or vane platform, an additional machining stock over and above the minimum value of 2 mm, so that it is even possible for a turbine blade or vane which has been rotated through 3° in the counter-clockwise direction to be produced from the same casting.

DESCRIPTION OF THE PREFERRED EMBODIMENTS

Referring now to the drawings, wherein like reference numerals designate identical or corresponding parts throughout the several views, FIG. 1 shows a plan view from above of an example of a casting for a turbine blade or vane from the first stage, having a blade or vane platform and a main blade or vane part, in accordance with the prior art. The casting 10 has a rectangular blade or vane platform 11 with (for example), external dimensions of 124.6 mm×133.8 mm. The actual main blade or vane part 12, the position of which relative to the blade or vane platform 11 determines the subsequent leading-edge angle of the turbine blade or vane (cf. also FIG. 2 of EP-A2-1 216 770 cited in the introduction), extends upward from the blade or vane platform 11 along a longitudinal axis 13. An additional machining stock 14 of 2 mm is provided, in a manner known per se, around the outer edges of the blade or vane platform 11 (area between the rectangle shown in dashed lines and the rectangle shown in solid lines in FIG. 1). This additional machining stock 14 provides material for the subsequent material-removing machining of the casting 10 which gives the turbine blade or vane its final shape.

The central idea of the invention now consists in designing the external dimensions of the casting in such a way that, during the subsequent machining, the leading-edge angle can be selected freely within a certain range of angles, so that the leading-edge angle can be matched to the particular conditions of the turbine by the machining operation without having to change the casting mold. For this purpose, it is necessary for the additional machining stock required for the machining on the corresponding surfaces of the blade or vane to be increased beyond the minimum value (for example of 2 mm) sufficiently far for machining to be possible with a rotated blade or vane. The larger the available range of angles is to be, the greater the thickness of the additional machining stock that has to be selected. The increased thickness of the additional machining stock has to be taken into account in the wax mold for the casting and slightly increases the machining outlay.

FIGS. 2 and 3 illustrate two examples of an increased thickness of the additional machining stock: the casting 10' shown in FIG. 2 is designed in such a way that the leading-edge angle of the subsequent turbine blade or vane can be altered by an angle of up to 3° in the clockwise direction (rotational arrow in FIG. 2). The casting 10" shown in FIG. 3 is designed in such a way that the leading-edge angle of the subsequent turbine blade or vane can be altered by an angle of up to 3° in the counterclockwise direction (rotation arrow in FIG. 3).

The starting position (without additional rotation) is shown in dashed lines in the region of the blade or vane platform 11 in both FIGS. 2 and 3. The rectangle shown in dashed lines is converted into the smaller of the two rectangles shown in solid lines as a result of the 3° rotation. The main blade or vane part 12 correspondingly rotates with it. If the rotated main blade or vane part 12 is to be based on the unrotated blade or vane platform 11 (shown in dashed lines), which would correspond to a rotation of the leading-edge angle, the outer boundaries of the blade or vane platform 11 have to be shifted outward, in accordance with the outer of the two rectangles shown in solid lines, sufficiently far for a minimum distance of 2 mm as additional machining stock to remain with respect to the rectangle shown in dashed lines representing the blade or vane platform which is achieved after machining. The blade or vane platform 11 of the casting 10' then has external dimensions of 131.1 mm×140 mm (additional machining stock 14'; FIG. 2), and the blade or vane platform 11 of the casting 10" then has external dimensions of 131.2 mm×140 mm (additional machining stock 14'; FIG. 3). If the starting point used is the larger of the two rectangles shown in solid lines, it is possible to machine a turbine blade or vane which has been rotated through −3° or +3° by removing material from the castings 10' or 10" as far as the rectangle shown in dashed lines.

To be machined, the casting 10' or 10" can be positioned in the holder of the machining tool in two different ways: in one case, the casting is rotated in the holder, with the reference points required for the machining being repositioned. In the other case, the casting is rotated together with the holder, in which case the correctly calculated distances are used to reach the desired position.

The option according to the invention of rotating the turbine blade or vane after casting is used primarily to adjust the guide vanes of the first stage in order to achieve the set objectives in improving the turbine.

In this case, the vanes are rotated through at most +/−2°. This requires an additional machining stock of approximately 5 mm compared to the standard machining stock of about 2 mm. In this case, rotation of the casting together with the holder is preferred for the machining.

Obviously, numerous modifications and variations of the present invention are possible in light of the above teachings. It is therefore to be understood that within the scope of the appended claims, the invention may be practiced otherwise than as specifically described herein.

| LIST OF DESIGNATIONS | |
|---|---|
| 10, 10', 10" | Casting |
| 11 | Blade or vane platform |
| 12 | Main blade or vane part |
| 13 | Longitudinal axis |
| 14, 14', 14" | Additional machining stock |

The invention claimed is:

1. A process for producing a turbine blade or vane having a longitudinal axis, comprising the steps of:
    providing a casting mold for casting the turbine blade or vane, the casting mold including a blade or vane platform and a main blade or vane part, and a position of the main blade or vane part relative to the blade or vane platform determining a first angle of incidence;
    providing additional machining stock to the blade or vane platform at predetermined locations;
    machining the casting using a process which is specified for the first angle of incidence;
    rotating the casting around a longitudinal axis for an angle which is equal to the difference between said first angle of incidence and a second angle of incidence, and
    subjecting said rotated casting to said machining process to remove at least partially the additional machining stock.

2. The process as claimed in claim 1, wherein:
    said casting is fixed in a holder during the machining process, and
    said rotating step includes rotating the casting in the holder.

3. The process as claimed in claim 1, wherein:
    said casting is fixed in a holder during the machining process, and
    said rotating step includes rotating the casting together with the holder.

4. The process as claimed in claim 1, further comprising the step of:
    selecting the thickness of the additional machining stock to be sufficiently above a minimum value for it to be possible for a turbine blade or vane which has an angle of incidence which can be selected freely within a predetermined range of angles to be produced by machining from the same casting.

5. The process as claimed in claim 1, further comprising the step of:

providing the additional machining stock above a minimum value at the blade or vane platform.

6. The process as claimed in claim 5, wherein:

the minimum value for the additional machining stock is approximately 2 mm, and the additional machining stock above the minimum value amounts to a total of about 5mm.

* * * * *